(No Model.)
5 Sheets—Sheet 1.
W. D. ROBINSON.
FILTER AND FILTER VALVE.
No. 576,378.  Patented Feb. 2, 1897.
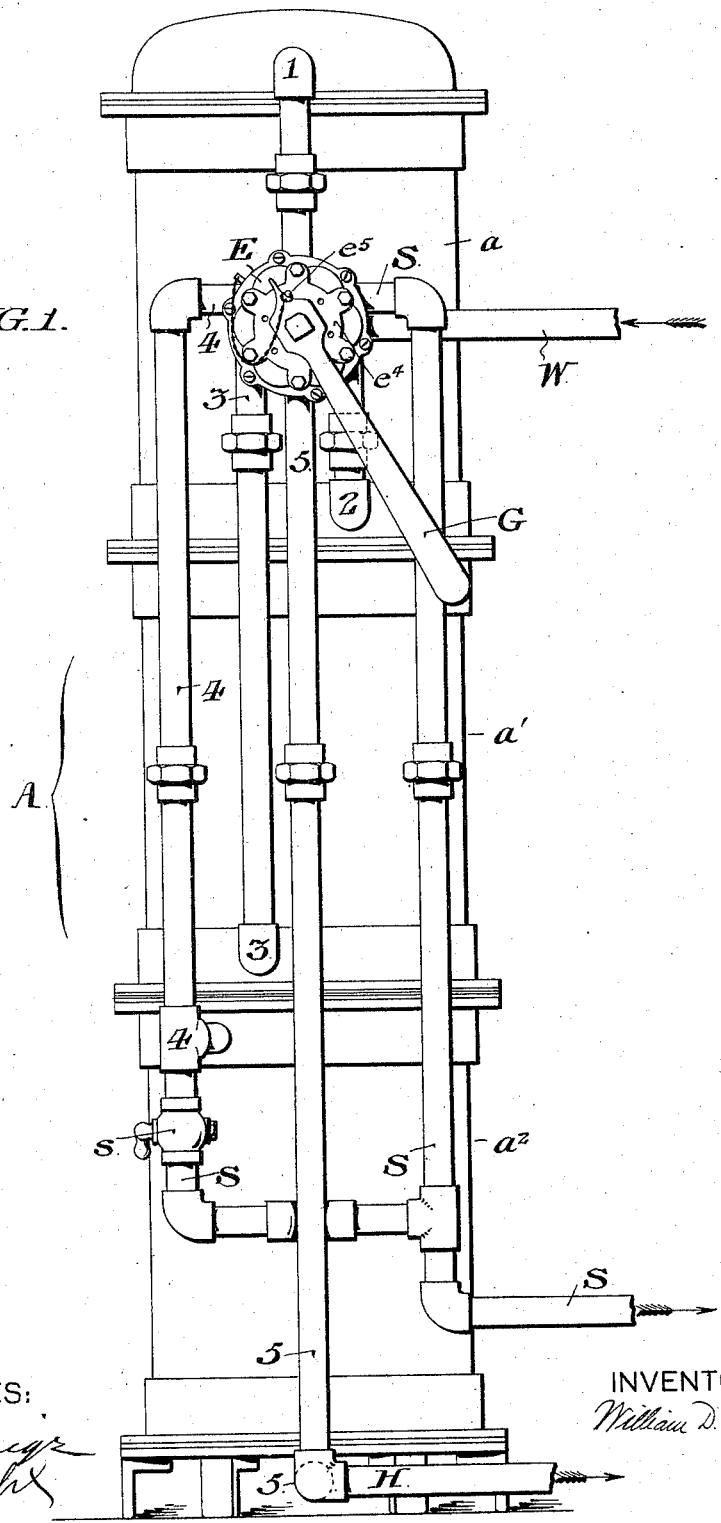
WITNESSES:
N. E. Paige
Sam Wright
INVENTOR:
William D. Robinson

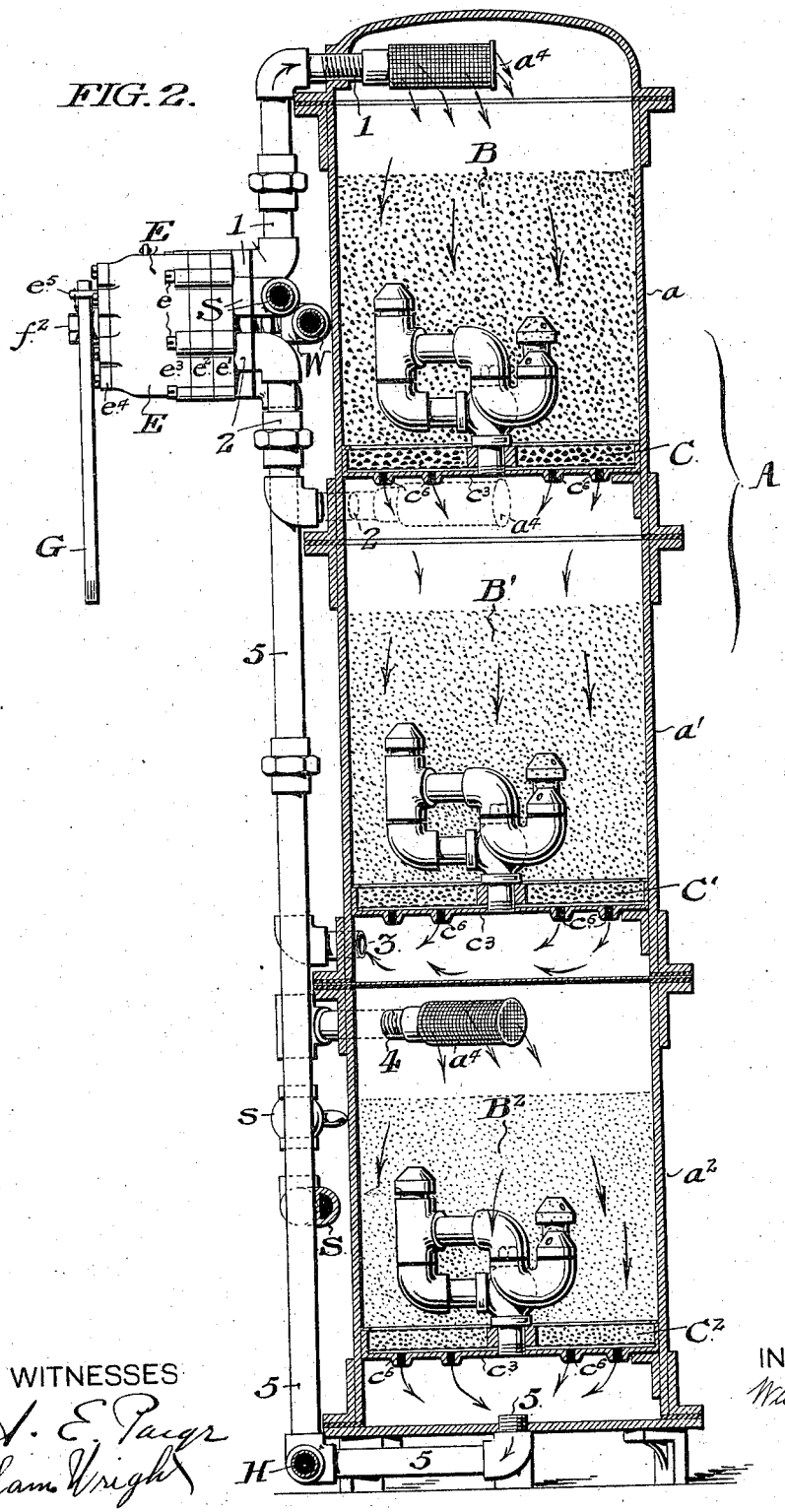

(No Model.) 5 Sheets—Sheet 3.
W. D. ROBINSON.
FILTER AND FILTER VALVE.
No. 576,378. Patented Feb. 2, 1897.
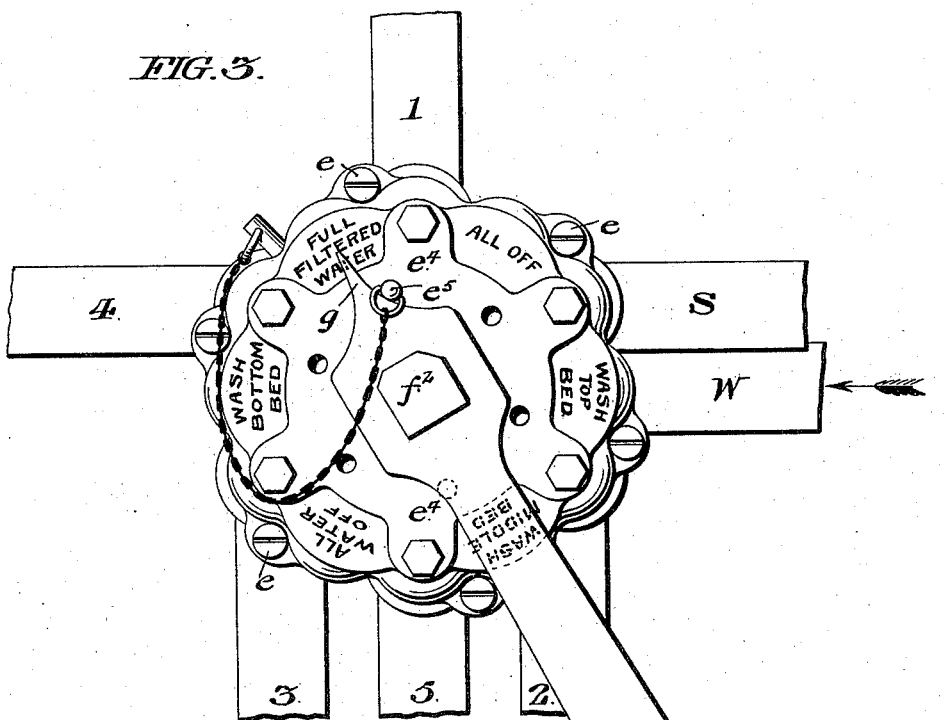
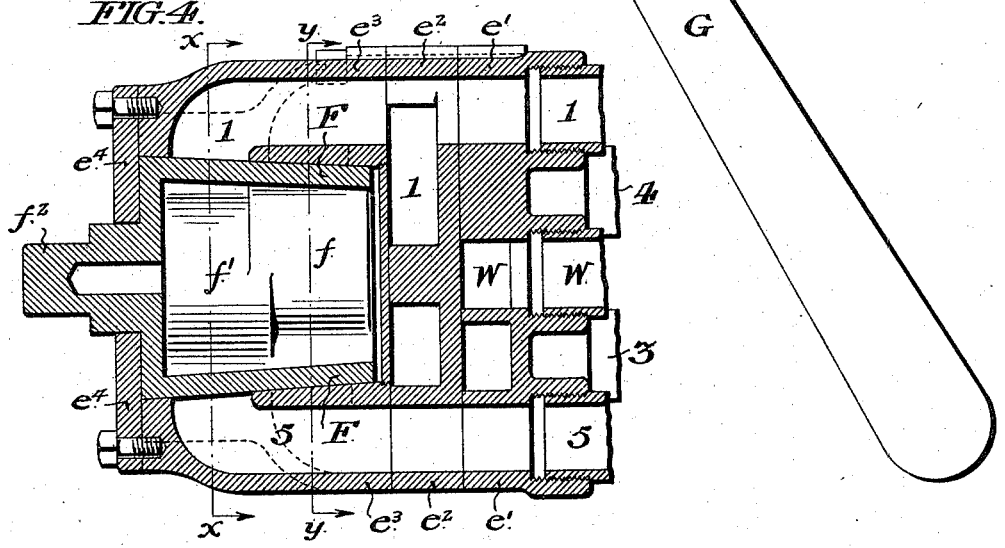
WITNESSES:
A. E. Paige
Sam. Wright
INVENTOR:
William D. Robinson (No Model.) W. D. ROBINSON. 5 Sheets—Sheet 4.
FILTER AND FILTER VALVE.

No. 576,378. Patented Feb. 2, 1897.

WITNESSES:
N. E. Paige
Sam. Wright

INVENTOR:
William D. Robinson.

(No Model.) 5 Sheets—Sheet 5.
W. D. ROBINSON.
FILTER AND FILTER VALVE.
No. 576,378. Patented Feb. 2, 1897.
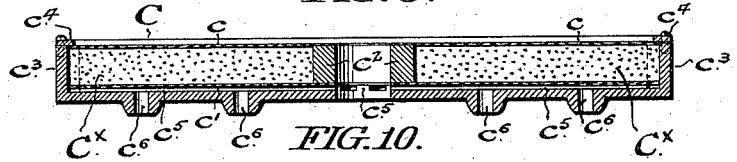
FIG. 9.
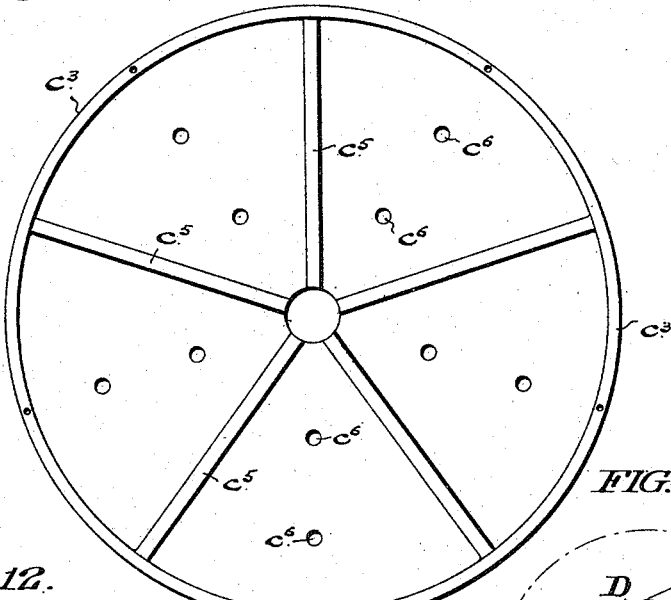
FIG. 10.
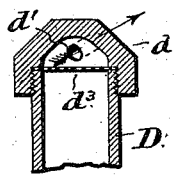
FIG. 12.
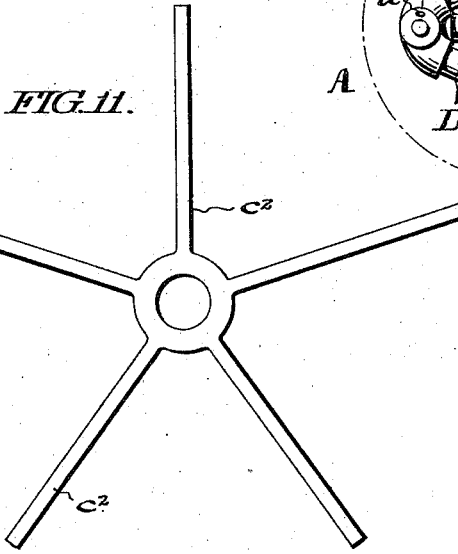
FIG. 14.
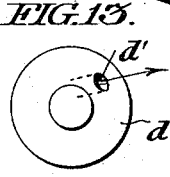
FIG. 13.
FIG. 11.
WITNESSES:
N. E. Paige
Sam. Wright
INVENTOR:
William D. Robinson

UNITED STATES PATENT OFFICE.

WILLIAM D. ROBINSON, OF PHILADELPHIA, PENNSYLVANIA.

FILTER AND FILTER-VALVE.

SPECIFICATION forming part of Letters Patent No. 576,378, dated February 2, 1897.

Application filed April 7, 1896. Serial No. 586,501. (No model.)

*To all whom it may concern:*

Be it known that I, WILLIAM D. ROBINSON, of Philadelphia, Pennsylvania, have invented certain new and useful Improvements in Filters and Filter-Valves, whereof the following is a specification.

My invention relates more particularly to that class of filters wherein the filtration of a liquid is accomplished by causing the said liquid to pass through masses of granular material and therein deposit its impurities.

My present invention comprises, first, a controlling-valve and suitable pipe connections, comprising an auxiliary valve, whereby the liquid may be directed through said masses in the direction for filtration, or by the manipulation of said valves each of the masses in the series may be separately cleansed by a flow of said liquid in the reverse direction and said impurities be automatically discharged from the apparatus; second, jet-orifices for the cleansing liquid, located within the said mass of filtering material in oblique or diagonal relation to the inclosure of said mass, whereby an upward rotary or spiral movement is imparted to said granules composing said mass, thus accomplishing by the liquid alone the immediate disintegration and continued turbulent agitation of said granules, thus scouring off all previously-deposited impurities adhering to the individual granules to be carried away by the outflowing liquid, and, third, certain details of construction of the said controlling-valve, hereinafter more definitely specified and claimed.

Figure 5:
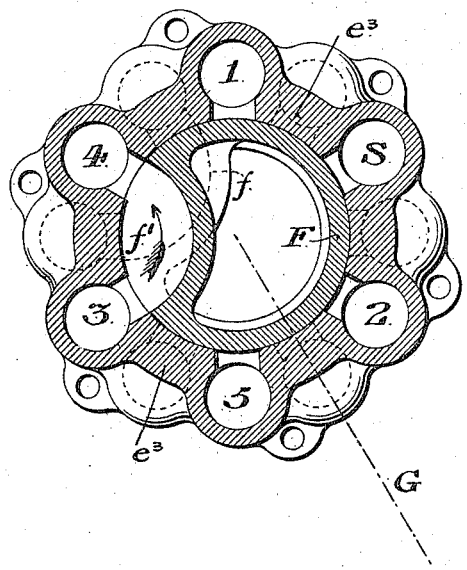
Figure 6:
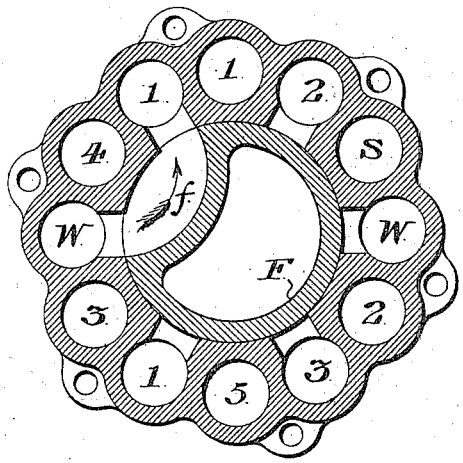
Figure 7:
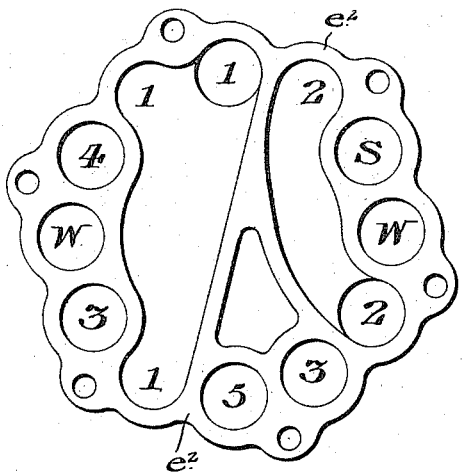
Figure 8:
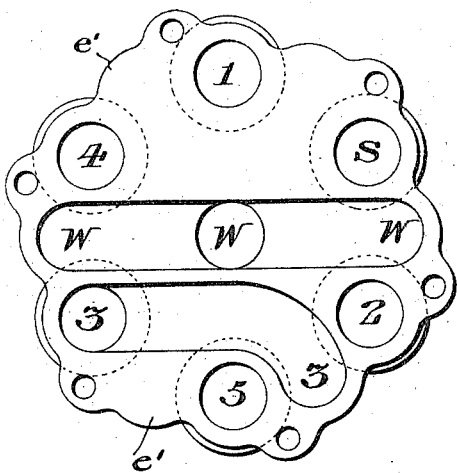

In the accompanying drawings, in which I have shown a convenient embodiment of the invention, Figure 1 is a front elevation of a controlling-valve and a casing containing the said masses of filtering material and provided with suitable pipe connections. Fig. 2 is a central vertical section of the apparatus of Fig. 1, certain parts being shown in elevation. Figs. 3 to 8 are detail views of the controlling-valve indicated in Figs. 1 and 2. Fig. 3 is a front elevation of said valve and its operating-handle. Fig. 4 is a vertical longitudinal section through the front, middle, and rear members of the valve-casing. Fig. 5 is a vertical transverse section through the front member of the valve-casing on the line $x\ x$ of Fig. 4. Fig. 6 is a vertical transverse section through the front member of the valve-casing on the line $y\ y$ of Fig. 4. Fig. 7 is a front elevation of the middle member of the valve-casing. Fig. 8 is a front elevation of the rear member of the valve-casing. Fig. 9 is a vertical central section, on a larger scale, of one of the supporting-diaphragms shown in Fig. 2. Fig. 10 is a plan view of the pan-frame of the diaphragm. Fig. 11 is a plan view of the spider-frame of the diaphragm, which is adapted to fit in the said pan-frame of Fig. 10. Fig. 12 is a central vertical section, on a larger scale, of one of the restricted nozzle-outlets of the cleansing-pipe indicated in Fig. 2. Fig. 13 is a plan view of the nozzle shown in Fig. 12. Fig. 14 is a plan view of one of the cleansing-pipes with its branches and nozzles.

Similar letters and numerals indicate corresponding parts in the several figures.

A is the filter-casing, conveniently made in three sections or compartments $a\ a'\ a^2$, containing respective masses of filtering material B B' B² and provided with respective supporting-diaphragms C C' C². Each of said diaphragms (see Figs. 9, 10, and 11) comprise perforated top and bottom screens C C', separated by a spider-frame $c^2$, conveniently mounted in a pan-frame $c^3$, which is supported from the casing A in any suitable manner. The top screen $c$ is secured upon said frame by a ring $c^4$ and the bottom screen $c'$ is supported above the bottom of the pan-frame upon ribs $c^5$, thus giving free passage for the liquid through the remainder of the screen area. The bottom of said pan-frame is provided with a number of openings $c^6$, so placed as to permit of a uniform flow of liquid throughout the area of the diaphragm. The aggregate area of said openings $c^6$ is equal to the area of the supply-pipe, for reasons hereinafter set forth in reference to the cleansing operation of the apparatus. The spaces between the top and bottom screens $c\ c'$ of said diaphragms are filled with granular filtering material $C^\times$ in the interstices of the respective spider-frames $c^2$. It is obviously expedient that the diaphragms C, C', and C² should not only support the respective superimposed masses B, B', and B² in such a manner as to permit the liquid to flow through them without obstruction, but also prevent the passage of the minute granules forming said superimposed masses, and thus absolutely confine said granular masses within their respective compartments. The use of screening alone does not effect this double result, for the reason that if the perforations are sufficiently minute to prevent the passage of the granules they are quickly clogged and the flow of liquid substantially diminished. The insertion beneath each of said masses of a relatively coarser granular material, as indicated between the diaphragm-screens, permits the use of larger perforations in said screens, said perforations being merely small enough to prevent the escape of the said coarse granules. The beds of coarse granules so placed afford an effectual barrier to the passage of the superimposed finer granules, while permitting an unobstructed flow of the liquid in either direction. Centrally mounted upon the top of each of said diaphragms is a branched cleansing-pipe D. (See Figs. 2 and 14.) Said pipe D has an unrestricted opening through the center of said diaphragm. The branches of said pipe terminate at different levels within the superimposed mass of granular material and are each provided with a cap or nozzle $d$, having a restricted opening $d'$. Said openings extend obliquely upward through said nozzles. The effect of such a construction of the nozzle is to induce a rotary movement of the liquid discharged into the said mass of granular material, as more fully set forth hereinafter.

I have illustrated the pipes D as provided with three branches and nozzles. It is obvious that their number may be varied in accordance with the dimensions of the apparatus in which they are embodied, being, however, so proportioned as to give the best result therein.

The cleansing-pipes D perform no function during the ordinary operation of filtering, said pipes being provided with suitable check-valves $d^2$, which only open in the direction for cleansing. The pipes D may be protected from the inflow of the filtering material by screens $d^3$, placed in the nozzles, as indicated in Fig. 12.

The casing A is provided with five external openings, which are numbered 1, 2, 3, 4, and 5. Said openings serve both as outlets and inlets during the various operations of the apparatus and may be provided with screen-caps $a^4$ to prevent the egress of the filtering material during the cleansing operation.

Five ducts lead, respectively, from said openings in the casing A to the rear of a controlling-valve E, terminating therein in openings grouped about a ported valve-plug F. To avoid multiplicity of reference-marks, each of said ducts is designated throughout its extent by the number of its respective opening in the casing A.

The casing of the valve E is conveniently cast in three sections secured together by screws $e$. The rear section $e'$ (see Fig. 8) is provided with two ducts in addition to the five already mentioned. The one marked W is a liquid-supply inlet. The other (marked S) is a drain-outlet for dirty water. Said rear section $e'$ is suitably chambered in its front side to communicate with nine orifices in the rear side of the middle section $e^2$, which is also suitably chambered in its front side (see Fig. 7) to communicate with twelve openings grouped in two zones of six each about the chamber containing the valve-plug F in the front section $e^3$. The plug F is provided with a rear port $f$, adapted to register with the six alternate openings which terminate in said rear zone, as shown in Fig. 6 and indicated by the dotted lines of Fig. 4. The front port $f'$ in said plug F is adapted to register with the other six alternate openings which terminate in the front zone, as shown in Figs. 4 and 5. The said ports $f$ and $f'$ are each adapted to connect two adjoining openings in their respective zones. Their relative circumferential position is shown in Fig. 5, and their position relative to the valve-operating handle G is indicated in said figure by the dot-and-dash line.

A handle, lug, or stem $f^2$ upon the plug F extends through the cap-plate $e^4$. Said lug is irregularly shaped to fit a corresponding opening in the operating-handle G, so that said handle, which is conveniently removable, cannot be wrongly placed on said lug. An index $g$ on said handle it adapted to traverse the front face of the cap-plate $e^4$, which is graduated into six parts, and the effect upon the apparatus and its operation when the plug F is rotated by the handle G into said respective positions is indicated by the following inscriptions upon said plate $e^4$: "Full filtered water," "Wash top bed," "Wash middle bed," "Wash bottom bed," "All water off," and "All off." In the two positions of valve-plug F indicated, respectively, by "All water off" and by "All off," all communication through said valve E is shut off.

To facilitate the accurate manipulation of the valve-handle G, six sockets are provided in said cap-plate $e^4$, and a removable stop-pin $e^5$, adapted to fit said sockets, is conveniently chained to the valve-casing. Said stop-pin is inserted in the socket corresponding with the desired position of the valve-plug F, and the valve-handle G is then rotated into contact with it, as shown in Fig. 3.

The embodiment of my invention which I have illustrated is adapted to filter water received through the supply-inlet W. In the several views of the apparatus the controlling-valve E is in the normal position in which "Full filtered water" is delivered, as indicated by the dial of Fig. 3.

By reference to Figs. 2, 5, and 6 it may be seen that in said position of the valve the water is directed from the supply-inlet W by the port $f$ in the plug F to the duct 1, leading into the casing A at the top of the compartment $a$, passes thence down through the mass B, diaphragm C, mass B', and diaphragm C', thence out through the duct 3, from the compartment $a'$ to the valve, by the port $f'$ in the plug F to the duct 4, leading into the casing A at the top of the compartment $a^2$, thence down through the mass $B^2$ and diaphragm $C^2$, out through the duct 5 in the bottom of the compartment $a^2$, to the delivery-pipe H, leading from the apparatus.

I will now describe the operation of separately cleansing the mass of filtering material in the lower compartment $a^2$ of the casing A.

The stop-pin $e^5$ is placed in the proper socket in the cap-plate $e^4$, and the handle G is rotated until its index $g$ points to the inscription "Wash bottom bed." In said position the water is directed from the supply-inlet W by the port $f$ in the plug F to the duct I, leading into the top of the compartment $a$, passes thence down through the mass B, diaphragm C, the mass B', and the diaphragm C', thence out through the duct 3 in the compartment $a'$ to the valve, by the port $f'$ to the duct 5, leading to the bottom of the compartment $a^2$ and also to the delivery-pipe H. Thus the pressure is maintained in the delivery-pipe H while said water is directed through the duct 5 into the compartment $a^2$. The water there admitted has access to the ten small holes $c^6$ in the bottom of the pan-frame $c^3$ and also to the cleansing-pipe D, the check-valve $d^2$ opening freely by upward pressure. The said pipe D, with its branch outlets near the top of the mass $B^2$, offers less resistance to the passage of the cleansing water than the said holes $c^6$, which have a greater depth of overlying material. The resulting action is therefore as follows: The said water first finds an outlet from the upper branch of said pipe D, because of the slight depth of material overlying it. Any granules which have fallen in the restricted opening $d'$ in the nozzle $d$ are ejected, and the high pressure of the jet issuing obliquely from said opening $d'$ instantly breaks up the overlying mass of granules with a whirling movement that is quickly imparted to the whole upper stratum of granules. The next lower nozzle $d$ is thus relieved of a portion of resistance and begins to operate likewise. Thus the third and lowest nozzle $d$ is permitted to operate. The water then forces its way in vertical jets through the ten holes $c^6$ in the pan-frame. Owing to the fact that the aggregate area of said holes is only equal to the area of the supply-inlet there is no substantial diminution in its force when said supply is divided into the said ten jets. The effect of the continuous turbulent agitation of the whole mass of granules which is thus produced is to thoroughly scour each granule. The impurities thus rubbed off are carried by the water thence through the screen-cap $a^4$ of the duct 4, which prevents the egress of the granules. Said dirty water passes through the lower portion of the duct 4, through the opened valve $s$, and thence out through the drain-duct S. The auxiliary valve $s$ remains closed except during the above-described operation of washing the bottom bed.

The operation of the branched cleansing-pipe D and the diaphragm-jets being the same in the compartments $a$ and $a'$ as that just described in relation to the compartment $a^2$, I will not describe the operation therein, it being, however, understood that by the proper manipulation of the handle G the water may be directed from the inlet W to separately cleanse either of said compartments, as indicated upon the dial of Fig. 3 by the respective inscriptions, "Wash top bed" and "Wash middle bed," without breaking up or disturbing any other than the bed being cleansed.

In the position of the valve indicated by "Wash top bed" the water entering the valve E by the duct W is directed through the duct 2, thence through the top bed in compartment $a$, out through duct 1 to valve E, and thence, laden with the impurities washed from the filtering material, passes into duct S and away.

In the position of the valve indicated by "Wash middle bed" the water entering the valve E by the duct W is directed through the duct 3, thence through the middle bed in compartment $a'$, out through duct 2 to valve E, and thence into duct S and away. Of course in both positions of the valve last described the duct 4 is closed at valve E, as are all of the ducts when not in use. The filtered water in duct 4 is thus separated from the dirty wash-water passing through valve E.

In the filtration of water by the embodiment of my invention which I have illustrated I find it convenient to use the following-sized granules: In the mass B, No. 2; in the diaphragm C, No. 3; in mass B', No. 1; in the diaphragm C', No. 2; in the mass $B^2$, No. 0, and in the diaphragm $C^2$, No. 1. Said numbers have reference to the commercial sizes of granulated flint. I prefer to use said material in the mass B, but in the mass B', I find it convenient to use marble granules of the designated size, and I have obtained very satisfactory results by the use of magnetic carbid-of-iron granules of the respective size above mentioned in the mass $B^2$. I do not, however, desire to limit myself to the aforesaid materials or relative sizes of granules in the respective masses. I do not desire to limit myself to a series of three masses nor to the precise arrangement of said masses which I have illustrated, as it is obvious that many changes may be made therein without departing from the spirit of my invention.

It is furthermore obvious that the ducts leading into valve E may enter either of the three sections of said valve. I therefore do not desire to limit myself to the precise form of said valve which I have shown and described.

I therefore claim—

1. In a filter, a series of three compartments, a controlling-valve, provided with a liquid-supply inlet and a drain-outlet for dirty liquid, in addition to ducts connecting each of said compartments with said valve, the relation of said members being such, that the filtered liquid in the last compartment of the series, in communication with the delivery-pipe leading from the filter, may be shut off from the supply of unfiltered liquid and said liquid be simultaneously diverted from its normal course, to cleanse either of the other compartments of the series, and thence directed to the outlet for dirty liquid, substantially as set forth.

2. In a filter a series of three compartments a controlling-valve, provided with a liquid-supply inlet and a drain-pipe, an auxiliary valve for said drain-pipe, and ducts connecting each of said compartments with said controlling-valve, the relation of said members being such, that by the manipulation of said controlling-valve, the liquid filtered through the first two compartments may be reversely directed to cleanse the third compartment and by the manipulation of said auxiliary valve, be discharged into the said drain-pipe, during the continuous delivery of pure filtered liquid from the apparatus, substantially as set forth.

3. In a valve, a casing having a plurality of external orifices, a valve-plug chamber a plurality of ports opening into said chamber, a plug fitted to rotate in said chamber and provided with a port, adapted to register with said chamber-ports, a plane member of the valve-casing adapted to permanently connect a predetermined pair of said chamber-ports, by a passage-way in said plane casing member, substantially as set forth.

4. In a valve, a casing having seven external orifices, a plug-chamber, twelve ports opening into said plug-chamber, a plug fitted to rotate in said chamber, and provided with two ports, adapted to register with said chamber-ports, two plane members of said casing each adapted to permanently connect predetermined pairs of said chamber-ports by passage-ways in said plane members of the casing, substantially as set forth.

WILLIAM D. ROBINSON.

Witnesses:
   J. E. CARPENTER,
   A. E. PAIGE.